United States Patent [19]

Dodd et al.

[11] Patent Number: 5,895,050
[45] Date of Patent: Apr. 20, 1999

[54] QUESTION AND ANSWER GAME

[76] Inventors: Alan E. Dodd; Diane M. Dodd, both of 52 Church St., Highbridge, N.J. 08829

[21] Appl. No.: 08/998,381

[22] Filed: Dec. 24, 1997

[51] Int. Cl.[6] .................................. A63F 9/18; G09B 3/06
[52] U.S. Cl. ...................... 273/431; 434/347; 434/348
[58] Field of Search ................................ 273/429, 430, 273/431, 432, 302; 434/347, 348

[56] References Cited

U.S. PATENT DOCUMENTS

| | | | |
|---|---|---|---|
| 2,305,972 | 12/1942 | Lorber | 434/348 X |
| 4,326,711 | 4/1982 | Giallombardo | 273/1 R |
| 4,606,546 | 8/1986 | Rita | 273/269 |
| 4,736,954 | 4/1988 | Haney et al. | 273/236 |
| 5,120,066 | 6/1992 | Cohen | 273/258 |
| 5,145,184 | 9/1992 | Yearick et al. | 273/248 |
| 5,257,939 | 11/1993 | Robinson et al. | 434/129 |
| 5,316,482 | 5/1994 | Bryson | 434/129 |

*Primary Examiner*—William H. Grieb
*Attorney, Agent, or Firm*—Synnestvedt & Lechner

[57] ABSTRACT

A question and answer game is disclosed comprising a card. The card has a first and second side. On the first side, a question and a code key are displayed. The code key correlates answer indicia to key indicia. On the second side, a list of possible answers, only one of which is a correct, is displayed along with a particular key indicium. Each possible answer has a corresponding answer indicium. The particular key indicium corresponds to a correct answer indicium in the code key, and the correct answer indicium corresponds, in turn, to the correct answer. In the method embodiment of the invention, a player reads the question displayed on the first side of the card. Next, the list of possible answers displayed on the second side is read. At any point after the question is read, answers may be proffered. To determine the correct answer, a player reads the particular key indicium displayed on the second side of the card. The player then flips the card around to the first side to associate the particular key indicium to the correct answer indicium using the code key. Next, the player again flips the card over to associate the correct answer indicium with the correct answer on the second side.

20 Claims, 4 Drawing Sheets

QUESTION AND ANSWER GAME

BACKGROUND OF THE INVENTION

1. Field of the Invention

The present invention relates generally to a question and answer game/tutorial. More specifically, the present invention relates to a method and device for encoding a correct answer such that a user may read a question and a list of possible answers without learning the identity of the correct answer.

2. Background

Question and answer games and tutorials are both entertaining and educational. Traditionally, these games involve selecting a person to read a question from a card to a group of people. Along with the question, often times a list of possible answers will be provided. The person reading the question, however, is generally precluded from responding to the question because usually he or she learns of the correct answer when reading the card. This also prohibits the reader from using the game in a solitary or self-study manner. It is therefore preferred that measures be taken to conceal the correct answer from the reader.

A variety of games involve a card having a coded answer. For example, some games use a card having a question with a corresponding coded indicium. A separate reference is used to decode the indicium and determine the correct answer or identity. Using a separate document, however, can be awkward and frequently the answer key is lost or otherwise separated from the question card.

Other games use a card having a question and possible answers on the same side. The answer key is provided on the reverse side. Although this card may allow the reader to read both the question and possible answers without knowing the correct answer, it does not allow the reader to read just the question without seeing the possible answers. Frequently, it is preferable to "take a crack" at answering a question without looking at the possible answers.

Therefore, a need exists for a question and answer game that conceals the identity of the correct answer from reader while he or she reads the question and the possible answers. The present invention fulfills this need among others.

SUMMARY OF THE PRESENT INVENTION

The present invention is directed to a question and answer game that conceals the identity of a correct answer from the reader by employing two cooperating answer keys which must be used in concert to ascertain the correct answer. The cooperating answer keys are disposed upon a printable medium such that only one answer key is readily readable for a given configuration of the printable medium. To read the other answer key, the user must manipulate the printable medium in some manner. For example, the cooperating answer keys may be disposed on opposite sides of the printable medium thereby requiring the user to flip the medium to read both answer keys.

The cooperating keys are preferably sequential such that one answer key depends upon information provided by the other key. The first key in the sequence may be located on the side with the possible answers, and the second key in the sequence may be located on the side with the question. This way, if the user glances at the second key while reading the question, it will reveal very little about the answer even if the user also sees the first key while reading the possible answers. To determine the correct answer, the user must first read the first key (on the side with the answers), and then flip the printable medium over and read the second key (on the side with the question). Thus, the user must take affirmative steps to decode the correct answer even when viewing the answer keys.

In a preferred embodiment, the device comprises a printable medium, such as a card or page in a book, which has a first and second side. The question is printed on the first side and the possible answers are printed on the second side. Also printed on the second side is the first of a sequence of two answer keys. The first answer key is preferably a particular key indicium. The second answer key of the sequence is found on the first side, and, preferably, is a code key correlating answer indicia to key indicia. Each possible answer has a corresponding answer indicium. The particular key indicium corresponds to a correct answer indicium in the code key, and the correct answer indicium corresponds, in turn, to the correct answer.

In a preferred method embodiment of the invention, a player reads the question displayed on the first side of the card. Next, the list of possible answers displayed on the second side is read. At any point after the question is read, answers may be proffered. To determine the correct answer, the player reads the particular key indicium displayed on the second side of the card. The player then flips the card around to the first side to associate the particular key indicium to the correct answer indicium using the code key. Next, the player again flips the card over to associate the correct answer indicium with the correct answer on the second side.

Thus, the present invention facilitates a question and answer session that allows the reader to read just the question without learning the correct answer, or to read both the question and a list of possible answers without learning the identity of the correct answer. This allows the reader to be as involved in the session as the other participants. It also allows the reader to play the game in a solitary or self-study manner.

BRIEF DESCRIPTION OF THE DRAWINGS

The features of the present invention, which are believed to be novel, are set forth with particularity in the appended claims. The invention may best be understood by reference to the following description taken in conjunction with the accompanying drawings, wherein like reference numerals identify like elements, and wherein:

DETAILED DESCRIPTION OF THE PRESENT INVENTION

The present invention relates to a question/answer device and method that employs two cooperating answer keys enabling a player to read a question and a list of possible answers without learning the identity of the correct answer. In one embodiment, the device comprises a printable medium having a question, a list of possible answers, and two cooperating answer keys which cooperate to provide an indication of a correct answer. As used herein, the term "printable medium" broadly refers to a medium capable of being printed or embossed with indicia and includes, for example, paper, card stock, pages of a book, braille, canvas, and cardboard. The term "indicia" is also intended to have broad meaning and include, for example, number, letters, colors, shapes, symbols, graphical representations, and combinations of two or more thereof. The indicia used for encoding purposes is also completely discretionary.

It should be apparent that the form and subject matter of the question is only limited by the imagination of the user. It may be in any conventional form including fill-in-the-blank, open ended, true/false, yes/no, etc, or it may be a graphical representation. The subject matter is also totally discretionary and may include common subjects such as sports, history, entertainment, and science. In one embodiment, the subject matter is more esoteric and used for study and self-enrichment purposes. For example, cards or books with pages of the same format may be developed for preparing for legal bar exams or medical board exams, or for sharpening knowledge in specific topics such as antiques and art history.

The cooperating answer keys are disposed upon the printable medium such that the reader is able to conveniently read only one of them for a given medium configuration. To read the other key, some manipulation of the medium is required. For example, the two keys may be on opposite sides of the printed medium requiring the user to flip the medium; they may be on different pages requiring the user to turn the page; one may be concealed by a removable cover requiring the user to remove the cover; or they may be inverted relative to one another requiring the user to turn the medium up-side-down.

Figure 1A:
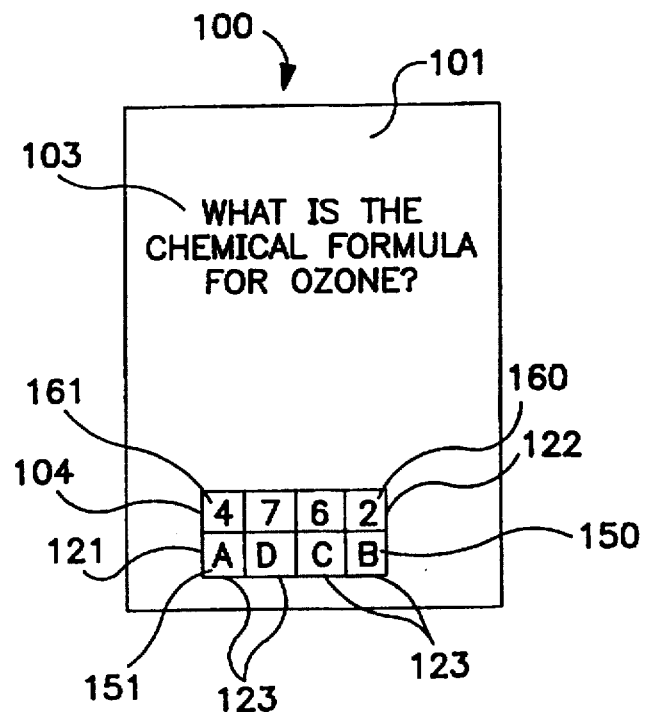
FIGS. 1A & 1B show the first and second side respectively of an exemplary card.
Figure 1B:
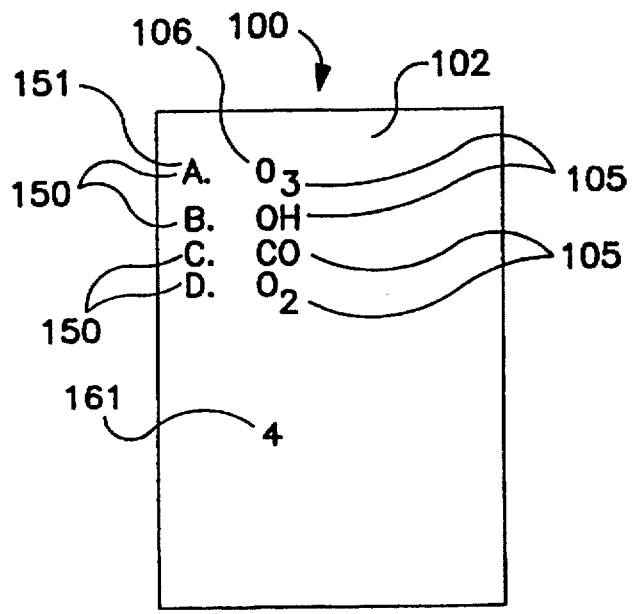

Referring to the figures, preferred embodiments of the device are shown. An exemplary card 100 is depicted in FIGS. 1a & 1b which correspond to the card's first and second sides 101, 102 respectively. The first side 101 displays a question 103 and a code key 104. The code key 104 correlates answer indicia 150 to key indicia 160. The code key 104 rows may be filled out in a different random order for each card to further prevent pattern recognition by the reader.

The second side displays a list of possible answers 105 only one of which is a correct answer 106. Each possible answer 105 has a corresponding answer indicium 150. The second side 102 also displays a particular key indicium 161 that corresponds to a correct answer indicium 151 in the code key 104. The correct answer indicium 151 corresponds to the correct answer 106.

In this particular embodiment, the code key 104 is a table having two rows 121, 122 and a plurality of columns 123. Row 121 is populated with the answer indicia 150 and the other row 122 is populated with the key indicia 160. The correspondence between the particular correct answer indicium 151 and the correct answer 106 is achieved by having the correct answer indicium 151 and the particular key indicium 161 located in the same column. It should be understood that other code key configurations are possible. For example, the code key may be a table having two columns and a plurality of rows. One column would be populated with the answer indicium and the other column populated with the key indicia. Similar to the preferred embodiment above, the correct answer indicium and the particular key indicium would be in the same row.

Figure 3A:
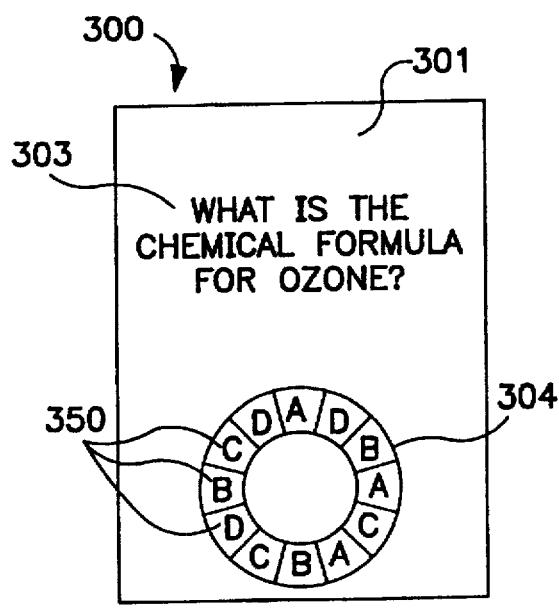
FIGS. 3A & 3B show the first and second side respectively of another exemplary card.
Figure 3B:
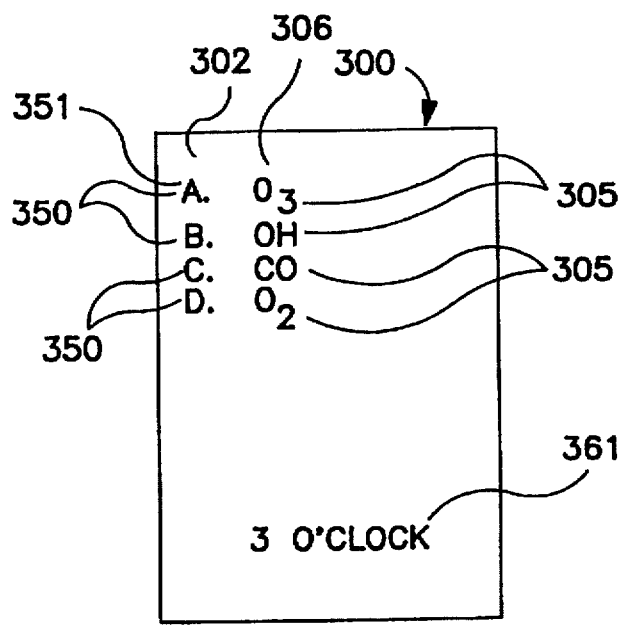

Another embodiment of the device is shown in FIGS. 3a & b which correspond to the first and second sides 301, 302 respectively of a card 300. The first side 301 displays a question 303 and a code key 304. The code key 304 correlates answer indicia 350 to particular positions. In this embodiment, the positions correspond to positions of an analog clock, for example, 1 o'clock, 2 o'clock, and so on. Other types of positions include, for example, positions on a compass, such as north, north-east, etc., and geographical references to a map, such as North America, Africa, etc. It may be preferable to choose a position key according to the theme of the game being played, for example, geographical positions may be appropriate for a game relating to geography.

The second side displays a list of possible answers 305 only one of which is a correct answer 306. Each possible answer 305 has a corresponding answer indicium 350, the correct answer 306 corresponds to a correct answer indicium 351. The second side 302 also displays a particular key indicium 361 which corresponds to a particular position. In this embodiment, the particular position is a position of an analog clock, 3 o'clock. This position corresponds to the position of the correct answer indicium 351 in the code key 304.

Figure 4:
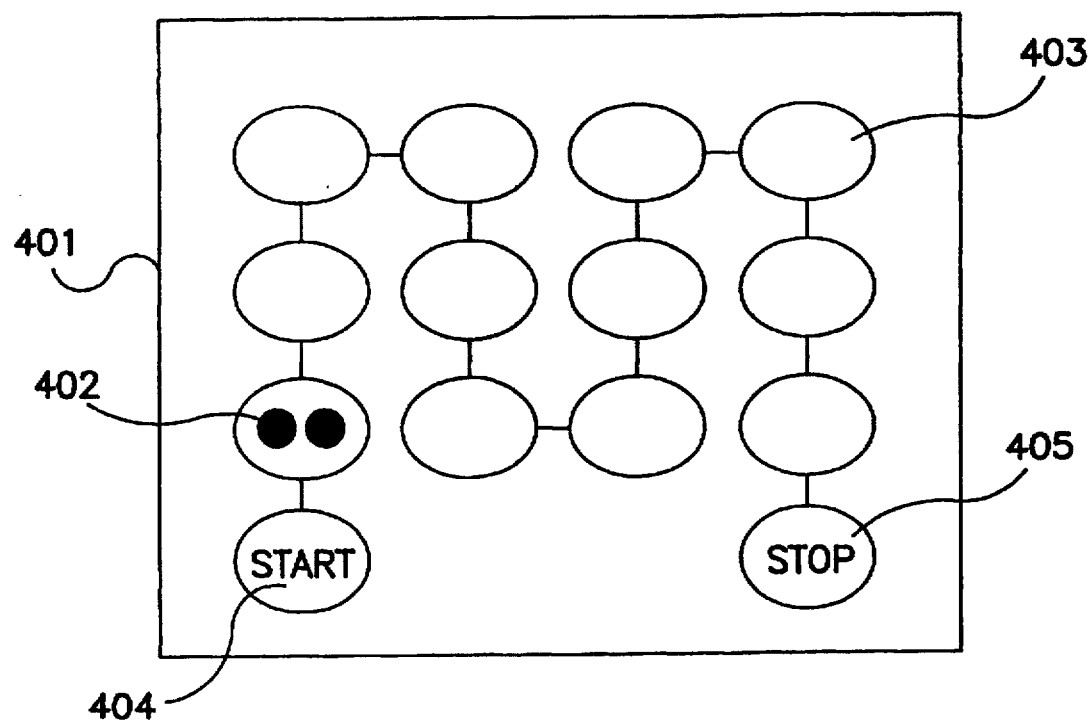
FIG. 4 shows one embodiment of the game of the present invention.

Another aspect of the invention, shown in FIG. 4, is a game comprising a game board 401 and place holders 402. Each player in the game has a specific place holder, which may range from simple, individually distinguishable chips to more elaborate symbolic figurines. The game board provides a progression of places 403 from a start point 404 to a stop point 405. The places are configured such that at least one place holder can fit therein. Each place holder is advanced along the progression of places according to the performance of the its associated player.

Figure 2:
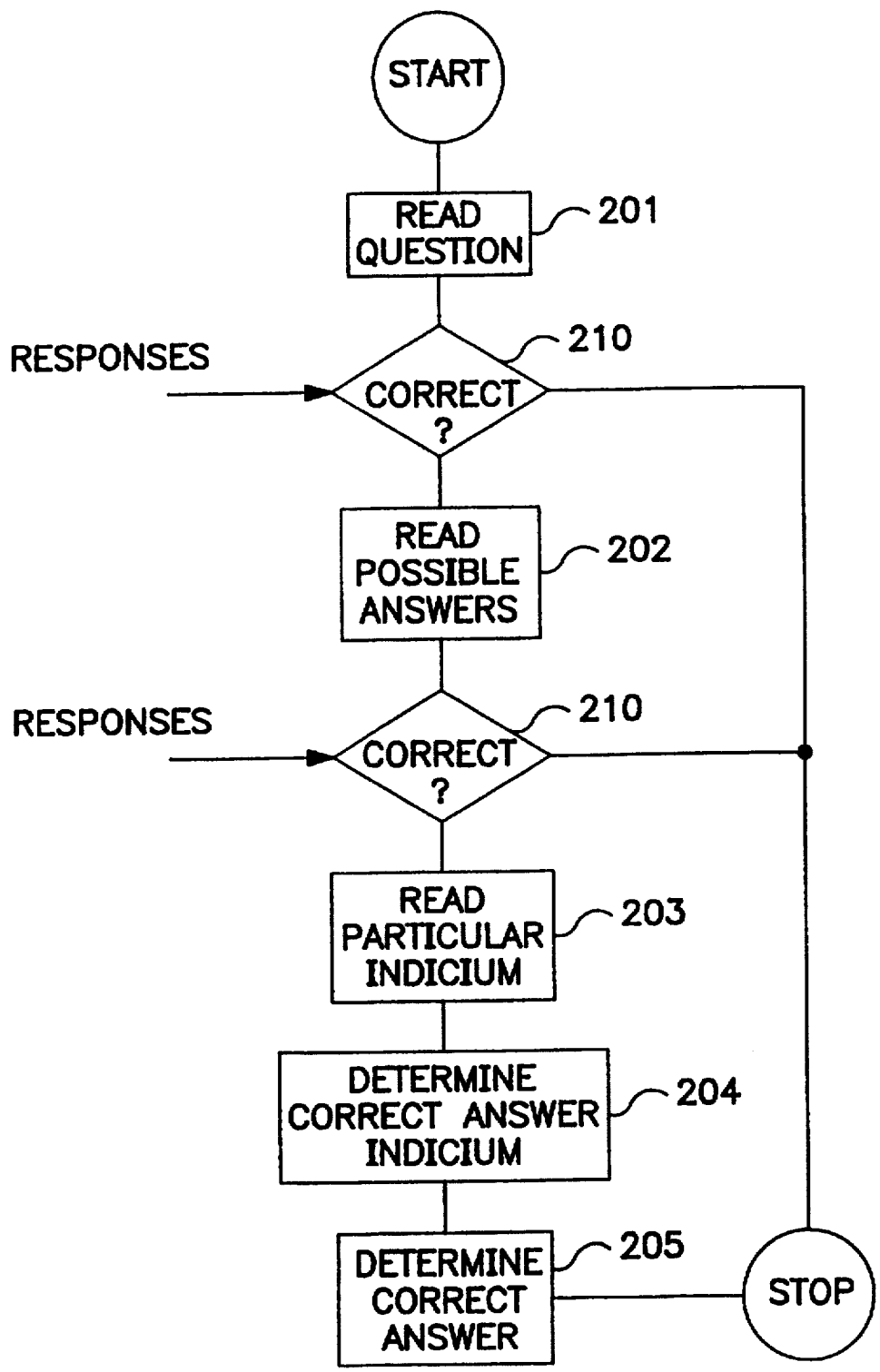
FIG. 2 shows a flow diagram of the steps involved in playing the game.

The game of the present invention may be played by one player, by a group of players competing with one another, or by two or more groups competing against each other. A schematic diagram of the steps involved in playing the game are depicted in FIG. 2. In Block 201, a player reads the question displayed on the first side of the card. Next, the list of possible answers displayed on the second side is read as depicted in Block 202. At any point after the questions is read, answers may be proffered as indicated by Block 210.

To determine the correct answer, a player reads the particular key indicium displayed on the second side of the card as shown in Block 203. The player then flips the card around to the first side to associate the particular key indicium to the correct answer indicium using the code key as depicted in Block 204. Next, in Block 205, the player again flips the card over to associate the correct answer indicium with the correct answer on the second side.

Thus, the card facilitates a method of reading an answer that allows the reader to read just the question without reading the answers or read both the question and a list of possible answers without learning the identity of the correct answer. Preventing the reader from learning the correct answer while reading the card is accomplished by requiring the reader to flip the card no less than two tunes to determine the answer. In other words, the reader can read both sides of the card without knowing the answer. Rather, he must take affirmative steps to decode the correct answer. This allows the reader to be as involved in the game as the other participants, or to play the game in a solitary or self-study manner.

Determining for whom the question is posed can vary. In one embodiment, all participants attempt to answer the question. Because the reader is not provided an indication of the answer, as mentioned above, he or she can remain involved in the game. Another embodiment of the invention involves the opposing groups of payers reading the questions to each other. Yet another embodiment involves just giving one player or a group of players the opportunity to answer. It should therefore be understood that the exact manner in which the questions are read and to whom they are posed can vary greatly, but the present invention allows the reader to remain a participant in the game, or to play the game in a solitary or self-study manner.

In the embodiment of invention having a game board and place markers, the forward progression of each place marker depends upon the performance of its associated player. The forward advancement certainly should be a reflection of the player's ability to correctly answer the question. In a preferred embodiment, however, the rate of progression per correct answer depends upon whether or not the player needed to review the possible answers. For example, if the player was able to answer the question without being privy to the possible answers, then he might advance two spaces. On the other hand, if he needed to review the answers before answering, then he might only proceed one space.

Obviously, numerous modifications and variations of the present invention are possible in the light of the above teachings. It is therefore understood that within the scope of the appended claims, the invention may be practiced otherwise than as specifically described herein.

What is claimed is:

1. A device for concealing the identity of a correct answer from a reader playing a question and answer game, said device comprising a printable medium having a question, a list of possible answers, and two cooperating answer keys which cooperate to provide an indication of a correct answer, said cooperating answer keys being disposed upon said printed medium such that only one answer key is conveniently readable for a given state of said printable medium.

2. The device of claim 1, wherein said printable medium has a first and second side, said first side displaying said question and said second side displaying said list of possible answers, said two cooperating answer keys being sequential, a first answer key of the sequence being on said second side and a second answer key of the sequence being on said first side.

3. The device of claim 2, wherein each possible answer has a corresponding answer indicium, wherein said first answer key is a particular key indicium, said particular key indicium corresponding to a correct answer indicium in a code key, and wherein said second answer key is a code key, said code key correlating answer indicia to key indicia, said correct answer indicium corresponding to said correct answer.

4. The game of claim 3, wherein said code key is a table having two rows and a plurality of columns, one row populated with said answer indicia and the other row populated with said key indica, said correct answer indicium and said particular key indicium being in the same column.

5. The game of claim 3, wherein said code key is a table having two columns and a plurality of rows, one column populated with said answer indicia and the other column populated with said key indica, said correct answer indicium and said particular key indicium being in the same row.

6. The game of claim 3, further comprising a game board and place holders.

7. The device of claim 2, wherein each possible answer has a corresponding answer indicium, said correct answer corresponding to a correct answer indicium, and wherein said first answer key is a particular key indicium corresponding to a position, and wherein said second answer key has said answer indicium disposed in one or more positions, said particular key indicium corresponding to a position of said correct answer indicium.

8. The device of claim 7, wherein said positions corresponds to positions of an analog clock.

9. A method of playing a question and answer game using a printable medium displaying two cooperating answer keys which cooperate to provide an indication of a correct answer, said cooperating answer keys being disposed upon said printed medium such that only one answer key is conveniently readable for a given state of said printable medium, said method comprising:

obtaining information from a first cooperating answer key;

manipulating the printable medium to view a second cooperating answer key; and obtaining an indication of the answer by applying said information from said first cooperating answer key to said second cooperating answer key.

10. The method of claim 9, wherein manipulating said printable medium is selected from the group consisting of flipping said printable medium, turning a page of said printable medium, uncovering said second cooperating answer key, and turning said printable medium up-side-down.

11. A method of playing a question and answer game comprising:

providing a printable medium having a first and second side and first and second sequential answer keys, said first side displaying a question and said second answer key, said second side displaying a list of possible answers and said first answer key;

reading said question;

flipping said printable medium to reveal said second side;

obtaining information from said first answer key;

flipping said readable medium to reveal said first side; and obtaining an indication of the answer by applying said information from said first answer key to said second answer key.

12. The method of claim 11, wherein each possible answer has a corresponding answer indicium, said correct answer corresponding to a correct answer indicium, and wherein said first answer key is a particular key indicium corresponding to a position, and wherein said second answer key has said answer indicium disposed in one or more positions, said particular key indicium corresponding to a position of said correct answer indicium, said method comprising:

reading said question displayed on said first side of said card;

reading a particular key indicium displayed on said second side;

associating said particular key indicium to said correct answer indicium using said code key on said first side; and associating said correct answer indicium with said correct answer on said second side.

13. The method of claim 11, wherein each possible answer has a corresponding answer indicium, wherein said first answer key is a code key, said code key correlating answer indicia to key indicia, and wherein said second answer key displaying a particular key indicium, said particular key indicium corresponding to a correct answer indicium in said code key, said correct answer indicium corresponding to said correct answer, said method comprising:

reading said question displayed on said first side of said card;

reading a particular key indicium displayed on said second side;

associating said particular key indicium to said correct answer indicium using said code key on said first side; and associating said correct answer indicium with said correct answer on said second side.

14. The method of claim 11, further comprising attempting to answer said question before associating said correct answer indicium with said correct answer on said second side.

15. The method of claim 11, further comprising:

attempting to answer said question before reading said list of possible answers.

16. The method of claim 15, further comprising:

rewarding a player for a correct answer, said player being rewarded more for answering a question correctly before said list of possible answers is read than after said list is read.

17. The method of claim 11, further comprising:

reading said list of possible answers.

18. The method of claim 11, wherein said game also comprises a board and place holders, each player in the game having a specific place holder, said game board providing a progression of places from a start point to a stop point, said method further comprising:

each player moving his place holder along said progression each time he correctly answers a question.

19. The method of claim 18, wherein the rate of progression per correct answer depends upon whether the player viewed said possible answers, said rate of progression being greater for a player who did not view said possible answers before answering said question correctly, than for a player who did view said possible answers.

20. The method of claim 11, further comprising awarding said printable medium to said player who correctly answered said question.

* * * * *